United States Patent
Zhang (10) Patent No.: US 11,967,092 B2
(45) Date of Patent: Apr. 23, 2024

(54) DETECTION-GUIDED TRACKING OF HUMAN DYNAMICS

(71) Applicant: SONY GROUP CORPORATION, Tokyo (JP)

(72) Inventor: Qing Zhang, Minato-ku (JP)

(73) Assignee: SONY GROUP CORPORATION, Tokyo (JP)

( * ) Notice: Subject to any disclaimer, the term of this patent is extended or adjusted under 35 U.S.C. 154(b) by 510 days.

(21) Appl. No.: 17/309,331

(22) PCT Filed: Nov. 26, 2019

(86) PCT No.: PCT/US2019/063187
§ 371 (c)(1),
(2) Date: May 19, 2021

(87) PCT Pub. No.: WO2020/112729
PCT Pub. Date: Jun. 4, 2020

(65) Prior Publication Data
US 2022/0130056 A1    Apr. 28, 2022

Related U.S. Application Data

(60) Provisional application No. 62/772,190, filed on Nov. 28, 2018.

(51) Int. Cl.
*G06K 9/00*       (2022.01)
*G06T 7/246*      (2017.01)
*G06T 7/60*       (2017.01)

(52) U.S. Cl.
CPC .............. *G06T 7/251* (2017.01); *G06T 7/248* (2017.01); *G06T 7/60* (2013.01);
(Continued)

(58) Field of Classification Search
CPC ........... G06T 7/251; G06T 7/248; G06T 7/60; G06T 2207/10016; G06T 2207/10024;
(Continued)

(56) References Cited

U.S. PATENT DOCUMENTS 8,345,984 B2    1/2013    Ji et al.

FOREIGN PATENT DOCUMENTS

CN    105160310 A    12/2015

OTHER PUBLICATIONS

Habermann, Marc, et al. "Reticam: Real-time human performance capture from monocular video." CoRR (2018). (Year: 2018).*
(Continued)

*Primary Examiner* — Jonathan S Lee
(74) *Attorney, Agent, or Firm* — CHIP LAW GROUP (57) ABSTRACT

A system and method for detection-guided tracking of human-dynamics is provided. The system receives an input human-dynamics sequence including geometry information and an RGB video of a human object. The system inputs the RGB video to the neural network and estimates a pose of the human object in each frame of the RGB video based on output of the neural network for the input. The system selects, from the input human-dynamics sequence, a key-frame for which the estimated pose is closest to a reference human pose. From the selected key-frame and up to a number of frames of the input human-dynamics sequence, the system generates a tracking sequence for a 3D human mesh of the human object. The generated tracking sequence includes final values of parameters of articulate motion and non-rigid motion of the 3D human mesh. Based on the generated tracking sequence, the system generates a free-viewpoint video.

21 Claims, 7 Drawing Sheets

(52) U.S. Cl.
CPC ........... *G06T 2207/10016* (2013.01); *G06T 2207/10024* (2013.01); *G06T 2207/20081* (2013.01); *G06T 2207/20084* (2013.01); *G06T 2207/30201* (2013.01)

(58) Field of Classification Search
CPC . G06T 2207/20081; G06T 2207/20084; G06T 2207/30201
USPC ........................................................ 382/103
See application file for complete search history.

(56) References Cited

OTHER PUBLICATIONS

Alldieck, Thiemo, et al. "Detailed human avatars from monocular video." 2018 International Conference on 3D Vision (3DV). IEEE, 2018. (Year: 2018).*

Xu, Weipeng, et al. "Monoperfcap: Human performance capture from monocular video." ACM Transactions on Graphics (ToG) 37.2 (2018): 1-15. (Year: 2018).*

Alvaro Collet et al. High-Quality Streamable Free-Viewpoint Video. ACM Transactions on Graphics, vol. 34, No. 4, Aug. 2015 [retrieved on Feb. 27, 2020]. Retrieved from , parts 1-3, fig.2.

Chuen-Chien Lee et al. Free viewpoint video (FVV) survey and future research direction. AP SIP A Transactions on Signal and Information Processing, vol. 4, Oct. 28, 2015 [retrieved on Feb. 27, 2020]. Retrieved from , parts 1-111, fig. 4, 7-14.

International Search Report and Written Opinion of PCT Application No. PCT/JP2019/063187, dated Mar. 5, 2020.

Kaiwen Guo et al. Robust Non-rigid Motion Tracking and Surface Reconstruction Using L0 Regularization. IEEE Transactions on Visualization and Computer Graphics, vol. 24, May 2018 [retrieved on Feb. 27, 2020]. Retrieved from , parts 1-6, fig.2.

Liang Zhao et al., Stereo- and neural network-based pedestrian detection, IEEE Transactions on Intelligent Transportation Systems, vol. 1, No. 3, Sep. 2000.

Tao Yu et al. BodyFusion: Real-Time Capture of Human Motion and Surface Geometry Using a Single Depth Camera. The IEEE International Conference on Computer Vision (ICCV), 2017 [retrieved on Feb. 27, 2020]. Retrieved from , abstract, parts 1-6.

Xue Mei et al. Sparse Representation of Cast Shadows via e1-Regularized Least Squares. 2009 IEEE 12th International Conference on Computer Vision (ICCV) [retrieved on Feb. 27, 2020]. Retrieved from , abstract, parts 1-3.

Yinghao Huang et al. Towards Accurate Marker-less Human Shape and Pose Estimation over Time. 2017 International Conference on 3D Vision (3DV). Jul. 2017. DOI: 10.1109/3DV.2017.00055 [retrieved on Feb. 27, 2020]. Retrieved from , parts 1-V, fig. 1-6.

* cited by examiner

DETECTION-GUIDED TRACKING OF HUMAN DYNAMICS

CROSS REFERENCE TO RELATED APPLICATIONS

This application is a U.S. National Phase of International Patent Application No. PCT/US2019/063187 filed on Nov. 26, 2019, which claims priority benefit of U.S. Provisional Patent Application No. 62/772,190 filed in the U.S. Patent Office on Nov. 28, 2018. Each of the above-referenced applications is hereby incorporated herein by reference in its entirety.

FIELD

Various embodiments of the disclosure relate to three-dimensional (3D) modeling technology and free-viewpoint visual media technology. More specifically, various embodiments of the disclosure relate to a system and method for detection-guided tracking of human-dynamics.

BACKGROUND

Advancements in the field of three-dimensional (3D) modeling technology have provided the ability to create a free-viewpoint video (FVV) as a visual media type that may offer flexible navigation on viewpoints in 3D. This may allow users to interactively control desired viewing angles and select viewpoints in FVV, rather than relying on broadcasters or content creators to set desired viewing angles and viewpoints. In conventional fixed-viewpoint systems, a desired two dimensional/three-dimensional (2D/3D) scene may only be viewed from a fixed viewpoint and the capability to manipulate and interact with viewpoints of the desired 2D/3D scene is absent. To generate an FVV, some of the conventional methods utilize human body template as an intermediate structure to combine articulate motion and nonrigid motion, but the tracking process always starts from a T-pose and fails soon if the sequence is long and rapid. Similarly, some other conventional methods estimate the human body template from a single RGB image and runs slow and generate a 2D consistent but 3D inaccurate shape. For example, while rendering a human model, some body parts (e.g., hands, legs, etc.) may appear to be slightly deformed or inaccurately shaped, with incomplete or incorrect texture mapping.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for detection-guided tracking of human-dynamics is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for detection-guided tracking of human-dynamics. Exemplary aspects of the disclosure provide a system that may deal with an input human-dynamics sequence containing an RGB video and scanned geometry (which can be either point cloud or a mesh). The system may generate a temporally consistent tracking sequence which provides a parametrization of skeletal joints, articulate motion, nonrigid motion, and the deformation of each 3D point. For each frame of the input human-dynamics sequence, this system may utilize a state-of-the-art neural network to detect 2D human joints and face landmarks and may then fit a human body template to the detected 2D points and the scanned geometry. The system may select a key-frame from the input human-dynamics sequence and from the key-frame up to a number of frames, the system may generate a tracking sequence for a 3D human mesh. The tracking sequence may include final values of parameters of articulate motion, nonrigid motion, and the deformation of each 3D point. With the guidance of neural network-based detection, human body estimation based on the detected 2D human joints and the face landmarks may be more accurate and robust for a long dynamic motion. Also, as the tracking sequence is generated based on a robust and a temporally-consistent output of the neural network, the system may prevent a tracking drift that typically occurs with traditional tracking methods.

Figure 1:
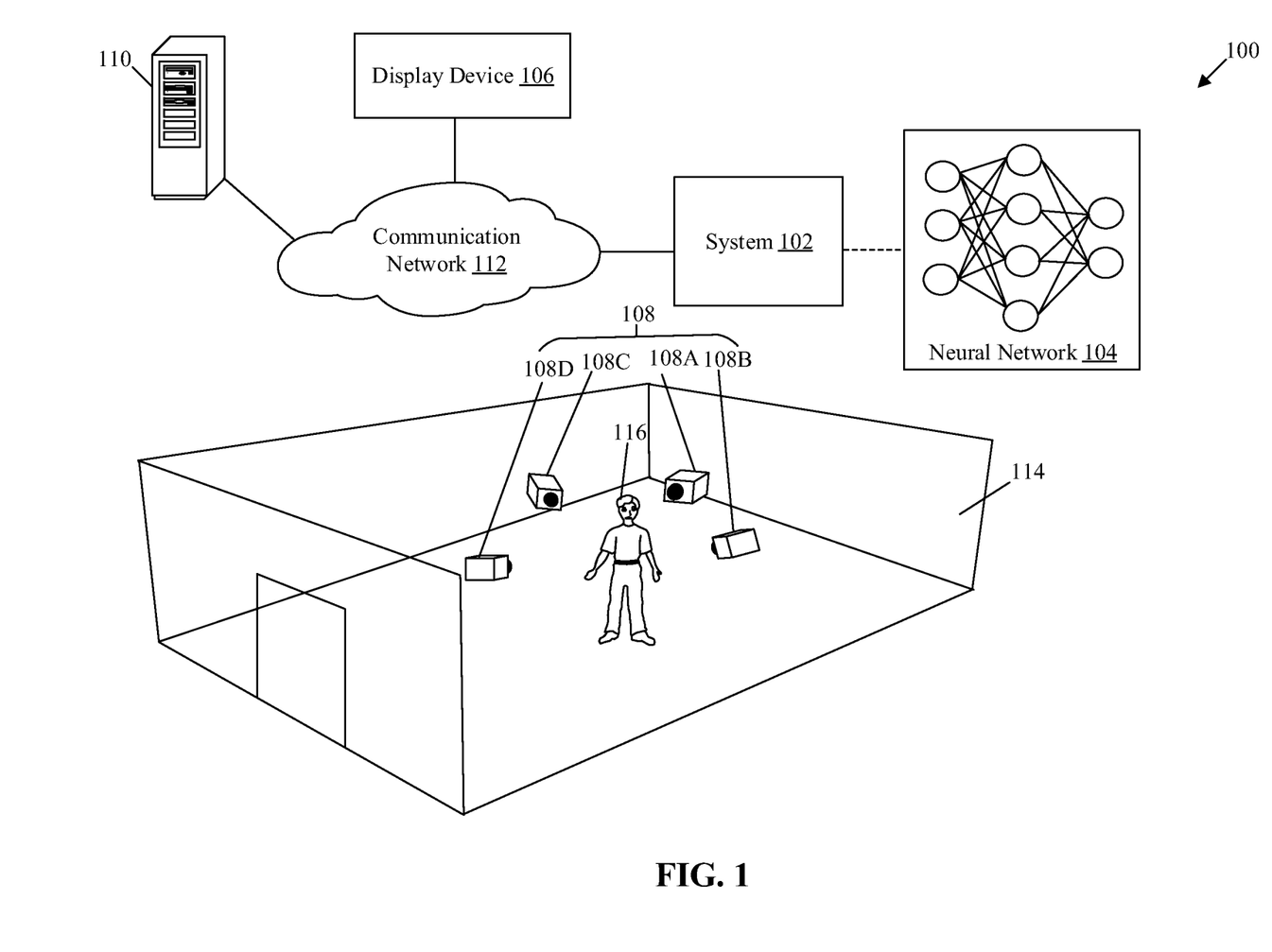
FIG. 1 is a block diagram that illustrates an exemplary network environment for detection-guided tracking of human-dynamics, in accordance with an embodiment of the disclosure.

FIG. 1 is a block diagram that illustrates an exemplary network environment for detection-guided tracking of human-dynamics, in accordance with an embodiment of the disclosure. With reference to FIG. 1, there is shown a network environment 100. The network environment 100 may include a system 102 that performs operations related to detection-guided tracking of human-dynamics. There is shown a neural network 104 which may be included in the system 102. The network environment 100 may further include a display device 106, a scanning setup 108 that includes a plurality of scanning devices 108A, 108B, 108C, and 108D, a server 110, and a communication network 112. The system 102 may be communicatively coupled to the display device 106, the scanning setup 108, and the server 110, via the communication network 112.

There is further shown a three-dimensional (3D) environment 114 in which the scanning setup 108 is deployed. In the 3D environment 114, there is shown a human object 116 surrounded by the plurality of scanning devices 108A, 108B, 108C, and 108D. The plurality of scanning devices 108A, 108B, 108C, and 108D may be (e.g., sparsely) located at multiple viewpoints in the 3D environment 114 and may collectively form a multi-scanner network having a combined Field-of-View (FoV) that covers an entire body surface of the human object 116. The human object 116 may be a part of the foreground of a scene in the 3D environment 114. The scene may also include other objects, details and illustrations of which are omitted from the disclosure for the sake of brevity.

It should be noted that the position, orientation, arrangement, and number of the plurality of scanning devices 108A, 108B, 108C, and 108D in FIG. 1 is merely presented as an example and should not be construed as limiting for the disclosure. The present disclosure may be also applicable to other positions, orientations, arrangements, and more or less numbers of scanning devices, without a deviation from scope of the disclosure.

The system 102 may include suitable logic, circuitry, interfaces, and/or code that may be configured to generate a tracking sequence for a 3D human mesh of the human object 116 based on an input human-dynamics sequence of the human object 116. Examples of the system 102 may include, but are not limited to, a video broadcasting system, an augmented reality-based device, a gaming device, a video processing device, a video editing system, a media production system, a computer workstation, a mainframe computer, a handheld computer, a mobile phone, a smart appliance, a video player, a digital camera, a video camera, a server, a consumer electronic (CE) device, and/or any other computing device with 3D graphics processing capability.

In FIG. 1, the system 102 and the scanning setup 108 are shown as two separate entities; however, in some embodiments, the functionality of the scanning setup 108 may be at least partially or fully incorporated in the system 102, without a deviation from scope of the disclosure.

The neural network 104 may be a computational network or a system of artificial neurons, arranged in a plurality of layers, as nodes. For example, the neural network 104 may be a multi-stage Convolutional Neural Network (CNN), or a hybrid variant of one or more neural network architecture (s). The plurality of layers of the neural network 104 may include an input layer, one or more hidden layers, and an output layer. Each layer may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network 104. Outputs of each hidden layer may be coupled to inputs of at least one node in other layers of the neural network 104. Node(s) in the final layer may receive inputs from at least one hidden layer to output a result. The number of layers and the number of nodes in each layer may be determined from hyper-parameters of the neural network 104. Such hyper-parameters may be set before or while training the neural network 104 on a training dataset.

Each node of the neural network 104 may correspond to a mathematical function (e.g., a sigmoid function or a Rectified Linear Unit (ReLU) with a set of parameters, tunable during training of the neural network 104. The set of parameters may include, for example, a weight parameter, a regularization parameter, and the like. Each node may use the mathematical function to compute an output based on one or more inputs from nodes in other layer(s) (e.g., previous layer(s)) of the neural network 104. All or some of the nodes of the neural network 104 may correspond to same or a different same mathematical function.

In at least one embodiment, the neural network 104 may include electronic data, such as, for example, a software program, program code, libraries, applications, scripts, or other logic or instructions for execution by a processing device, such as, by the system 102. The neural network 104 may include code and routines configured to enable a computing system, such as the system 102, to detect 2D skeletal joints and face landmark features from input image frames. Additionally, or alternatively, in some embodiments, the neural network 104 may be implemented using hardware including a processor, a microprocessor (e.g., to perform or control performance of one or more operations), a co-processor (e.g., an Artificial Intelligence (AI) Accelerator), a field-programmable gate array (FPGA), or an application-specific integrated circuit (ASIC). Alternatively, in some embodiments, the neural network 104 may be implemented using a combination of hardware and software.

The display device 106 may include suitable logic, circuitry, and interfaces that may be configured to render an FVV that reproduces a 3D scene and/or a performance of the human object 116 in the 3D environment 114. The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 106 may refer to a display screen of a head mounted device (HMD), a smart-glass device, a see-through display, a projection-based display, an electro-chromic display, or a transparent display.

The scanning setup 108 may include a plurality of scanning devices 108A, 108B, 108C, and 108D and a suitable logic, circuitry, interfaces, and/or code that may be configured to control the plurality of scanning devices 108A, 108B, 108C, and 108D to capture an input human-dynamics sequence. The input human-dynamics sequence may include a Red-Green-Blue (RGB) video of the human object 116 and geometry information of the human object 116.

For the input human-dynamics sequence, the scanning setup 108 may control the plurality of scanning devices 108A, 108B, 108C, and 108D to capture the RGB video from a set of viewpoints in the 3D environment 114. The plurality of scanning devices 108A, 108B, 108C, and 108D may be further controlled to acquire geometry information of the human object 116 from the set of viewpoints. The captured RGB video may include a sequence of frames of the human object 116. For example, the plurality of scanning devices 108A, 108B, 108C, and 108D may be at suitable locations in the 3D environment 114 to scan the entire body of the human object 116 in the 3D environment 114. The geometry information may include a sequence of Point Cloud Data (PCD) frames or a sequence of 3D meshes of the human object 116.

Typically, a viewpoint of a scanning device at any given time-instant may be determined based on one or more factors, for example, a relative position of the scanning device in the 3D environment 114, a scanning angle of the scanning device, and/or a relative orientation of the scanning device. Over a recording period of the performance of the human object 116 in the 3D environment 114, at least one scanning device of the plurality of scanning devices 108A, 108B, 108C, and 108D may be configured to be movable (or fixed) from their respective initial position(s) in the 3D environment 114. For example, the 3D environment 114 may include multiple operators. Each operator may hold a scanning device (e.g., an RGB-D camera) and may move the scanning device to record a performance of a performer (e.g., the human object 116), as the sequence of image frames and the sequence of PCD frames of the human object 116.

In at least one embodiment, the plurality of scanning devices 108A, 108B, 108C, and 108D may include a first scanning device 108A, a second scanning device 108B, a third scanning device 108C, and a fourth scanning device 108D. The first scanning device 108A, the second scanning device 108B, the third scanning device 108C, and the fourth scanning device 108D may collectively form a multi-scanner network to have a combined FoV that may cover an entire surface of the human object 116 in the 3D environment 114. The multi-sensor network may be referred to as a sparse-view network in cases where the multi-sensor network includes at most three or four scanning devices.

By way of example, and not limitation, each scanning device of the plurality of scanning devices 108A, 108B, 108C, and 108D may include one or more sensors, such as a combination of a depth sensor, an image sensor, a color sensor (such as a RGB sensor), and/or an infrared (IR) sensor that may capture color images or a 3D video of the human object 116 from a particular viewpoint.

By way of another example, and not limitation, at least one of the plurality of scanning devices 108A, 108B, 108C, and 108D may be an active 3D scanner that may rely on radiations or light signals (e.g., pulsed light signals) to scan a 3D structure of the human object 116 and to record the performance of the human object 116. For example, the active 3D scanner may be a Time-of-Flight (ToF)-based 3D laser scanner, a laser range-finder, a ToF camera, a hand-held laser scanner, a structured light 3D scanner, a modulated light 3D scanner, an aerial Light Detection and Ranging (LiDAR) laser scanner, a 3D LiDAR, a 3D motion sensor, and the like.

By way of another example, and not limitation, the plurality of scanning devices 108A, 108B, 108C, and 108D may be a network of heterogenous 3D sensors, for example, a network of standard cameras, depth sensors, ToF cameras, omnidirectional cameras, and actuated laser scanners.

The server 110 may include suitable logic, circuitry, and interfaces that may be configured to store the RGB video and the geometry information of the human object 116. Additionally, or alternatively, the server 110 may also store training data for the neural network 104 and may be responsible for training of the neural network 104 on the training data. Examples of the server 110 may include, but are not limited to, a database server, a file server, a web server, a cloud server, an application server, a mainframe server, or other types of servers.

In at least one embodiment, the server 110 may act as a repository of human-performances, where each human-performance may include a temporal sequence of a 3D human mesh of the human object 116, which when rendered, may re-enact a past and 3D scanned performance of the human object 116 (i.e. a performer of interest) in the 3D environment 114. In at least one embodiment, the server 110 may be implemented as a plurality of distributed cloud-based resources by use of several technologies that are well known to those skilled in the art. A person with ordinary skill in the art may understand that the scope of the disclosure is not limited to implementation of the server 110 and the system 102 as separate entities. In certain embodiments, the functionality of the server 110 may be incorporated in its entirety or at least partially in the system 102, without a departure from the scope of the disclosure.

The communication network 112 may include a communication medium through which the system 102, the plurality of scanning devices 108A, 108B, 108C, and 108D, and the server 110 may communicate with each other. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The 3D environment 114 may be a built environment (e.g., an indoor, an outdoor, or a studio space) or a natural environment in which a 3D scan of the human object 116 may be performed from a set of viewpoints to acquire the RGB video and the geometry information of the human object 116.

In operation, the system 102 may receive an input human-dynamics sequence that may include the RGB video of the human object 116 and the geometry information of the human object 116. The system 102 may input the RGB video to the neural network 104 and may estimate a pose of the human object 116 in each frame of the RGB video based on an output of the neural network 104 for the input. For example, the neural network 104 may estimate the pose of the human object 116 in each frame of the RGB video. The estimated pose may include features associated with human joints and face landmarks of the human object 116. Herein, the neural network 104 may be considered to be pre-trained to detect human joints and face landmarks of any human object in any given input video/image frame.

In at least one embodiment, the system 102 may construct a 3D human model for each frame of the input human-dynamics sequence by fitting a template human model on the estimated pose and the geometry information. Herein, the template human model may be a 3D template which may fit all body shapes, deform naturally to fit any human body pose, and even allow for soft tissue level or muscle level deformations.

From the input human-dynamics sequence, the system 102 may select a key-frame for which the estimated pose is closest to a reference human pose, for example, a T-pose. From the selected key-frame and up to a number of frames of the input human-dynamics sequence, the system 102 may generate a tracking sequence for a 3D human mesh. The 3D human mesh may include a set of 3D points that may represent the human object 116 in the 3D environment 114 and the generated tracking sequence may include final values of parameters of articulate motion and non-rigid motion of the set of 3D points on the 3D human mesh.

By way of example, and not limitation, to generate the tracking mesh sequence, the system 102 may construct a double-layered deformation graph using both Linear Blend Skinning (LBS/skinning weights) and an on-body node graph (also referred to as a nonrigid deformation graph) from the constructed 3D model associated with the selected key-frame. For the selected key-frame of the input human-dynamics sequence, initial values of parameters of articulate motion, nonrigid motion and the deformation of each node on the double-layered deformation graph may be used as an initial guess to solve an objective function (i.e. a hybrid optimization function) to estimate the final values of the parameters of the articulate motion, the nonrigid motion and the deformation of each node on the double-layered deformation graph. In at least one embodiment, the system 102 may also include albedo and/or lighting information in the tracking sequence up to a number of frames of the input human-dynamics sequence.

In at least one embodiment, the system 102 may further generate a free-viewpoint (FVV) video based on the generated tracking sequence for the 3D human mesh. In at least one embodiment, the system 102 may control the display device 106 to render the generated FVV. By tracking a single 3D human mesh from the selected key-frame and up to a number of frames of the input human-dynamics sequence, the system 102 may produce a temporally consistent FVV that offers a reduced temporal flicker and enables tracking of articulate motion, non-rigid motion, and texture (albedo/lighting) for a larger number of frames as compared to conventional state of the art tracking methods.

Figure 2:
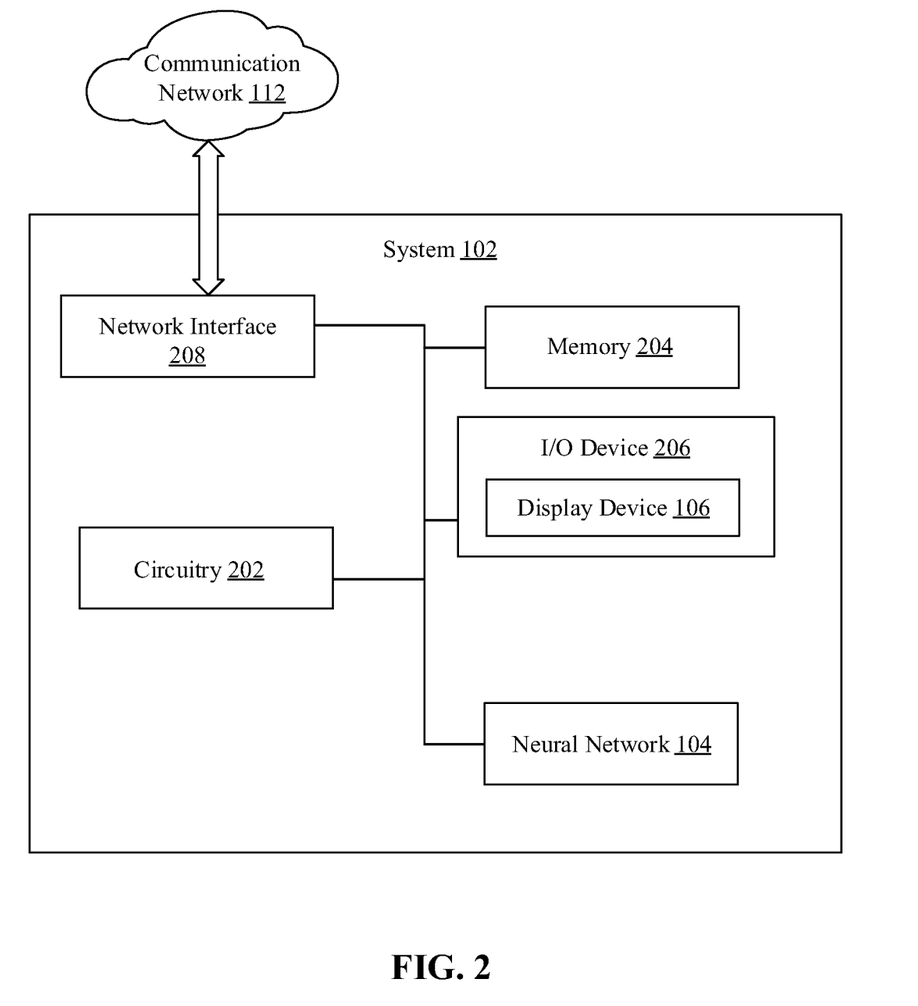
FIG. 2 is a block diagram that illustrates an exemplary system for detection-guided tracking of human-dynamics, in accordance with an embodiment of the disclosure.

FIG. 2 is a block diagram that illustrates an exemplary system for detection-guided tracking of human-dynamics, in accordance with an embodiment of the disclosure. FIG. 2 is explained in conjunction with elements from FIG. 1. With reference to FIG. 2, there is shown a block diagram 200 of the system 102. The system 102 may include the neural network 104, circuitry 202, a memory 204, and an I/O device 206 that may include the display device 106. The system 102 may also include a network interface 208. The circuitry 202 may be communicatively coupled to the memory 204, the I/O device 206, and the network interface 208. The circuitry 202 may be configured to communicate with the plurality of scanning devices 108A, 108B, 108C, and 108D and the server 110, via the network interface 208.

The circuitry 202 may include suitable logic, circuitry, and/or interfaces that may be configured to execute program instructions associated with different operations to be executed by the system 102. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 2, the circuitry 202 may include any number of processors configured to, individually or collectively, perform or direct performance of any number of operations of the system 102, as described in the present disclosure. Additionally, one or more of the processors may be present on one or more different electronic devices, such as different servers. In some embodiments, the circuitry 202 may be configured to interpret and/or execute program instructions and/or process data stored in the memory 204 and/or a persistent data storage. In some embodiments, the circuitry 202 may fetch program instructions from a persistent data storage and load the program instructions in the memory 204. After the program instructions are loaded into the memory 204, the circuitry 202 may execute the program instructions. Some of the examples of the circuitry 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, interfaces, and/or code that may be configured to store the program instructions executable by the circuitry 202. In certain embodiments, the memory 204 may be configured to store operating systems and associated application-specific information. Additionally, in certain embodiments, the memory 204 may be configured to store the neural network 104 pre-trained to detect the human joints and the face landmarks. The memory 204 may include computer-readable storage media for carrying or having computer-executable instructions or data structures stored thereon. Such computer-readable storage media may include any available media that may be accessed by a general-purpose or a special-purpose computer, such as the circuitry 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 202 to perform a certain operation or a group of operations associated with the system 102.

The I/O device 206 may include suitable logic, circuitry, interfaces, and/or code that may be configured to receive an input from a user and provide an output to the user based on the received input. The I/O device 206 may include various input and output devices, which may be configured to communicate with the circuitry 202. Examples of the input devices may include, but are not limited to, a touch screen, a keyboard, and/or a mouse. Examples of the output devices may include, but are not limited to, a display (such as the display device 106), and an audio device.

The network interface 208 may include suitable logic, circuitry, interfaces, and/or code that may be configured to establish communication between the system 102, the plurality of scanning devices 108A, 108B, 108C, and 108D, and the server 110, via the communication network 112. The network interface 208 may be implemented by use of various known technologies to support wired or wireless communication by the system 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC)

chipset, a subscriber identity module (SIM) card, and/or a local buffer. The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions or operations executed by the system 102, as described in FIG. 1, may be performed by the circuitry 202. Operations executed by the circuitry 202 are described in detail, for example, in the FIGS. 3A, 3B, 4, and 5.

Figure 3A:
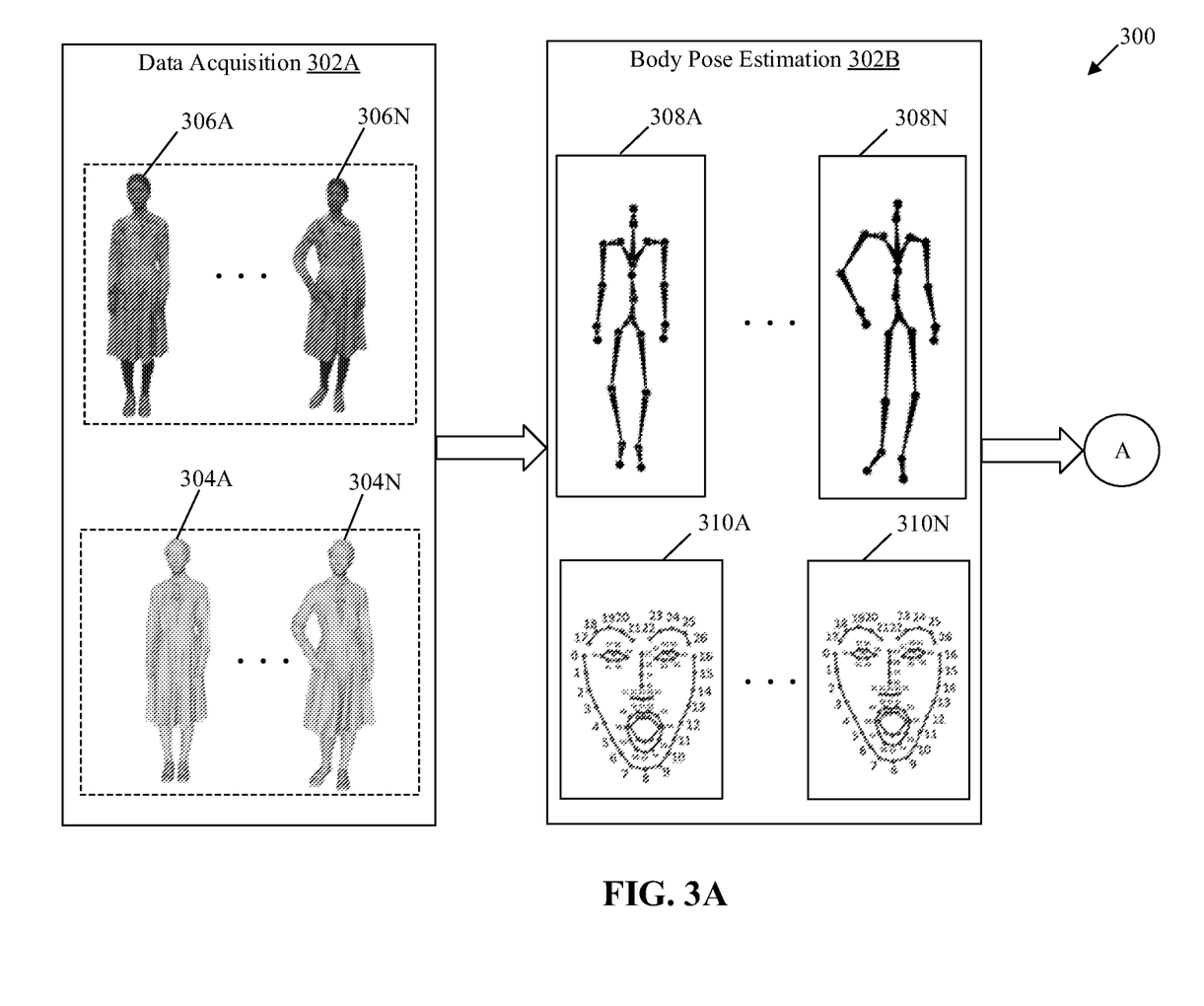
FIGS. 3A and 3B are diagrams which, collectively, illustrate an exemplary processing pipeline for generation of a tracking sequence of a 3D human mesh to be rendered as a free-viewpoint video, in accordance with an embodiment of the disclosure.
Figure 3B:
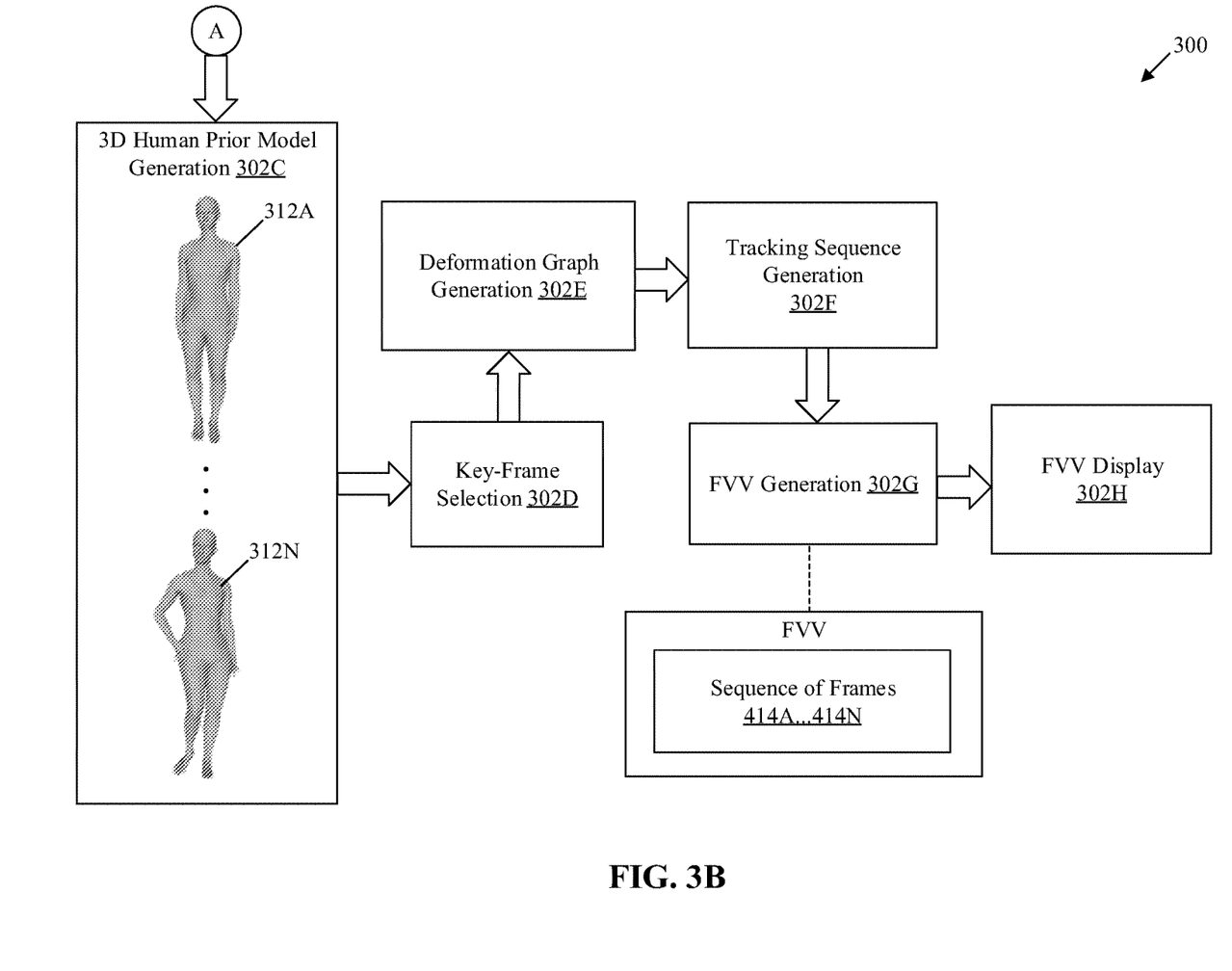

FIGS. 3A and 3B are diagrams which, collectively, illustrate an exemplary processing pipeline for generation of a tracking sequence of a 3D human mesh to be rendered as a free-viewpoint video, in accordance with an embodiment of the disclosure. FIGS. 3A and 3B are explained in conjunction with elements from FIG. 1 and FIG. 2. With reference to FIGS. 3A and 3B, there is shown a processing pipeline 300 that includes operations from 302A to 302H, as described herein.

At 302A, data acquisition may be performed. For data acquisition, the circuitry 202 may acquire an input human-dynamics sequence that may include geometry information 304A . . . 304N and a sequence of frames 306A . . . 306N of an RGB video. The input human-dynamics sequence may capture the performance of the human object 116 from a set of viewpoints in the 3D environment 114. In some embodiments, the geometry information 304A . . . 304N and the sequence of frames 306A . . . 306N of the RGB video may be acquired from a repository of human performance data on the server 110. By way of example, and not limitation, the geometry information 304A . . . 304N may include a sequence of PCD frames of the human object 116. Alternatively, the geometry information 304A . . . 304N may include a sequence of 3D meshes that corresponds to the human object 116 in the sequence of frames 306A . . . 306N. Each 3D mesh of the sequence of 3D meshes may include, for example, 3D points and associated 3D coordinate information, texture information, shading information, and lighting information associated with the human object 116. It should be noted that operations of every scanning device may be synchronized so as to ensure that every frame of the RGB video is aligned with 3D points of a respective PCD frame/a respective 3D mesh.

At 302B, body pose estimation may be performed. For body pose estimation, the circuitry 202 may input the RGB video (which includes the sequence of frames 306A . . . 306N) to the neural network 104. The neural network 104 may analyze the sequence of frames 306A . . . 306N of the RGB video to estimate human joints 308A . . . 308N and face landmarks 310A . . . 310N of the human object 116 in the sequence of frames 306A . . . 306N. Based on the output of the neural network 104 for the input, the circuitry 202 may estimate a pose of the human object 116 in each frame of the RGB video. The estimated pose may include features associated with the human joints 308A . . . 308N and the face landmarks 310A . . . 310N of the human object 116.

For instance, the neural network 104 may extract features associated with the human joints 308A . . . 308N of the human object 116 and the face landmarks 310A . . . 310N from the sequence of frames 306A . . . 306N of the RGB video. The human joints 308A . . . 308N and the face landmarks 310A . . . 310N may be associated with parameters of articulate motion of the human object 116. By way of example, and not limitation, the neural network 104 may be a "state of the art network", as described in, Cao et al, "Realtime Multi-Person 2D Pose Estimation using Part Affinity Fields", arXiv:1611.08050v2, which is incorporated herein for reference. In such a case, the neural network 104 may include multiple stages, such as a first stage of N (e.g., 10) layers of the VGGNet to create feature maps for each input, i.e. each frame of the sequence of frames 306A . . . 306N. In other stages, a branched multi-stage Convolutional Neural Network (CNN) may be implemented on the feature maps. The first branch may output a set of 2D confidence maps of body parts at respective locations (for example, elbow, knee, shoulder, etc.). The second branch may output a set of 2D vector fields of part affinities, which may encode an extent of association between part affinities. A greedy inference model may be implemented on the set of 2D confidence maps and the set of 2D vector fields to estimate features associated with the human joints 308A . . . 308N and the face landmarks 310A . . . 310N of the human object 116 in each frame of RGB video.

At 302C, 3D human prior model generation may be performed. For 3D human prior model generation, the circuitry 202 may construct a 3D human model (i.e. a human parametric model) for each frame in the sequence of frames 306A . . . 306N of the RGB video by fitting a template human model on the estimated pose and the received geometry information 304A . . . 304N. Herein, a sequence of 3D human models 312A . . . 312N may be obtained by fitting the template human model on the estimated pose in each frame of the RGB video and the received geometry information 304A . . . 304N. The template human model may be a 3D template which may fit all body shapes, deform naturally to fit any human body pose, and even allow for soft tissue level or muscle level deformations.

By way of another example, and not limitation, the template human model may be a Skinned Multi-Person Linear-X (SMPL-X) model, as described in, Pavlakos et al., "Expressive Body Capture: 3D Hands, Face, and Body from a Single Image", Proceedings IEEE Conf. on Computer Vision and Pattern Recognition (CVPR), 2019. The SMPL-X model is an upgrade of the SMPL model, as described in, Loper et. al., "SMPL: A Skinned Multi-Person Linear Model", ACM Trans. Graphics (Proc. SIGGRAPH Asia), 2015. In comparison to SMPL model, SMPL-X model may be suitable for dealing with movement of fingers, mouth and facial expressions.

At 302D, key-frame selection may be performed. For key-frame selection, the circuitry 202 may select, from the input human-dynamics sequence, a key-frame for which the estimated pose is closest to a reference human pose, for example, a T-pose. In at least one embodiment, the circuitry 202 may compare the estimated pose of the human object 116 in each frame of the input human-dynamics sequence with a reference human pose based on a threshold distance-measure. Thereafter, based on the comparison, the circuitry 202 may estimate a key-frame score for each frame of the input human-dynamics sequence and select, from the input human-dynamics sequence, a key-frame for which the estimated key-frame score is a maximum. By way of example, and not limitation, an SMPL-X pose of every 3D human model (at 302C) may be compared with a T-pose, using an equation (1), given as follows:

$$S_k = \sum_c \left(1 + (g_{max} - g_c) + \frac{A_c}{A_{max} + 1}\right) \quad (1)$$

where,
$S_k$ represents a key-frame score for a $k_{th}$ frame of the input human-dynamics sequence;
c represents the index of each connected mesh in one frame;
$g_c$ represents the genus of $c_{th}$ connected mesh;
$g_{max}$ represents the maximum genus of all the connected meshes in the sequence;
$A_c$ represents the surface area of $c_{th}$ connected mesh;
$A_{max}$ represents the maximum surface area of all the connected meshes in the sequence;

At 302E, deformation graph generation may be performed. The circuitry 202 may generate a double-layered deformation graph for the selected key-frame based on the constructed 3D human model. The double-layered deformation graph may include Linear Blend skinning (LBS) parameters for the articulate motion and an on-body node graph (i.e. a non-rigid deformation graph) for the non-rigid motion. Additionally, the double-layered deformation graph may include rigid deformation parameters for a rigid motion of a set of 3D points on a 3D human mesh of the human object 116.

By way of example, and not limitation, an exemplary method to construct double-layered deformation graph is described in Yu et al. 2018, "DoubleFusion: Real-time Capture of Human Performances with Inner Body Shapes from a Single Depth Sensor", CVPR 2018, arXiv: 1804.06023, which is herein mentioned for reference. The double-layered deformation graph may represent a double-layer surface of the human object 116 (i.e. the performer). From the double-layer surface, the outer layer may include observable surface portions, for example, clothing, visible body parts (e.g. face, hair), whereas the inner layer may represent a parametric human shape and skeleton model based on a constructed 3D model (e.g., the SMPL-X model). The motion of the outer layer may be parametrized by a set of nodes or vertices. The set of nodes may be sampled as on-body nodes and geodesic distance measurements may be used to construct the on-body node graph of the body of the human object 116. These on-body nodes may also be associated with the skeleton joints of the constructed 3D model (e.g., SMPL-X model). Additionally, far-body nodes on outer regions that appear close to the inner body region may be associated with the on-body node graph. Herein, deformations of regions far from the body may not be accurately represented with the on-body node graph. The double-layered deformation graph is explained further, for example, in FIG. 4.

At 302F, tracking sequence generation may be performed. The circuitry 202 may generate a tracking sequence for a 3D human mesh, from the selected key-frame and up to a number of frames of the input human-dynamics sequence. The generated tracking sequence may include final values of parameters of articulate motion and non-rigid motion of a set of 3D points on the 3D human mesh of the human object 116. The tracking sequence may be associated different features, such as with body motion, cloth motion, muscle deformation, and facial expressions associated with the human object 116 in the input human-dynamics sequence.

In at least one embodiment, from the sequence of frames 306A . . . 306N, the circuitry 202 may select a number of frames that may precede or succeed the selected key-frame. The circuitry 202 may further form pairs of consecutive frames based on the selected key-frame and the selected number of frames and may estimate the final values of parameters of the articulate motion and the non-rigid motion iteratively between each pair of the formed pairs of the consecutive frames. The final values of parameters of the articulate motion and the non-rigid motion may be estimated based on the generated double-layered deformation graph for the selected key-frame and an objective function (i.e. a hybrid optimization function) of the double-layered deformation graph. The objective function of the double-layered deformation graph is explained further, in detail, for example in FIG. 4.

In at least one embodiment, the circuitry 202 may establish a correspondence (e.g., a per-vertex correspondence) for albedo parameters and lighting parameters of the 3D human mesh from the selected key-frame and up to the selected number of frames. The correspondence may be established based on the objective function that may also include a light regularization term and an albedo term. In such a case, the tracking sequence may be generated further based on the established correspondence for the albedo parameters and the lighting parameters of the 3D human mesh of the human object 116.

At 302G, FVV generation may be performed. The circuitry 202 may generate an FVV based on the generated tracking sequence for the 3D human mesh. For example, by using conventional rendering methods, the tracking sequence may be used to generate a sequence of frames 314A . . . 314N of the FVV that captures the performance of the human object 116 in the 3D environment 114. While generating the FVV, the circuitry 202 may track the final values of the albedo parameters, the lighting parameters, and the parameters of the articulate motion, and the non-rigid motion associated with the human object 116 in the sequence of frames 314A . . . 314N of the FVV.

At 302H, FVV may be displayed on the display device 106. The circuitry 202 may control the display device 106 to render the FVV. Additionally, or alternatively, the circuitry 202 may share the generated FVV with one or more external media rendering devices. Additionally, or alternatively, the circuitry 202 may encode the generated FVV as a media file (such as MPEG) and may share the generated FVV with one or more external media rendering devices.

Although, the processing pipeline 300 is illustrated as discrete operations, such as 302A, 302B, 302C, 302D, 302E, 302F, 302G, and 302H; however, in certain embodiments, such discrete operations may be further divided into additional operations, combined into fewer operations, or eliminated, depending on the particular implementation without detracting from the essence of the disclosed embodiments.

Figure 4:
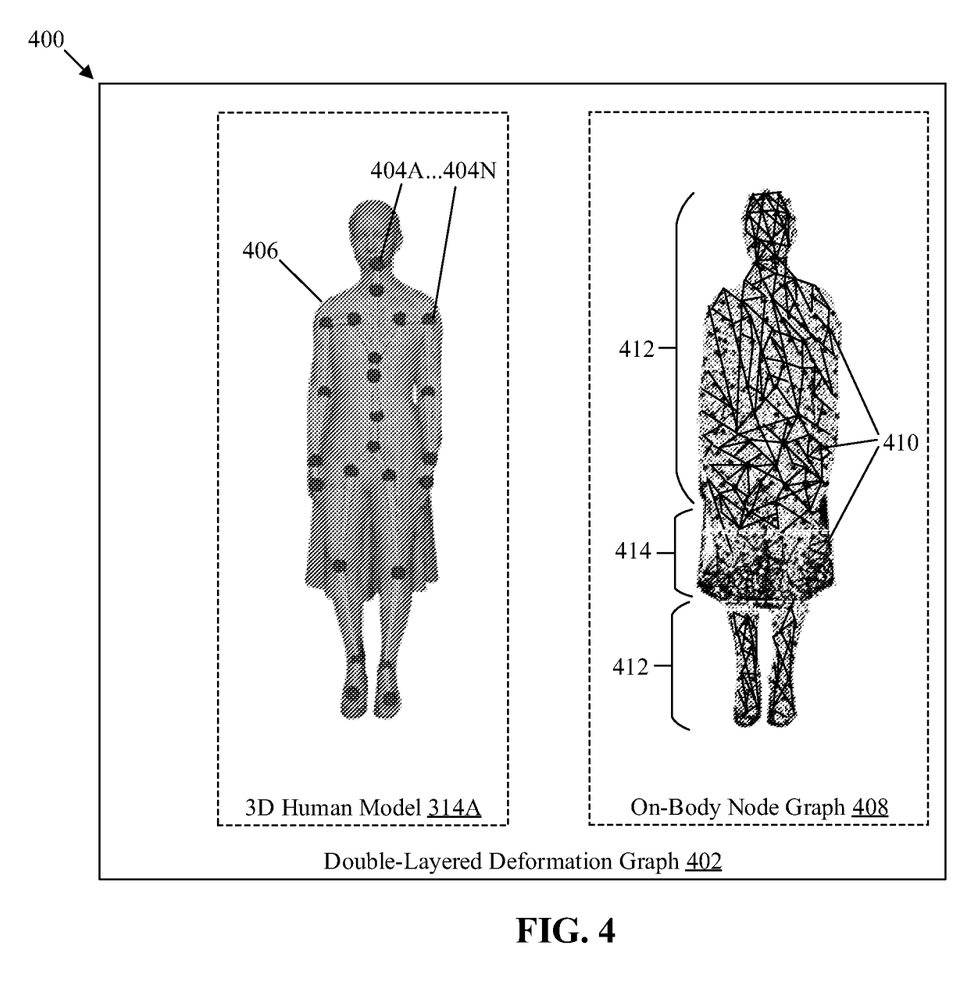
FIG. 4 is a diagram that illustrates exemplary operations related to a double-layered deformation graph, in accordance with an embodiment of the disclosure.

FIG. 4 is a diagram that illustrates exemplary operations related to a double-layered deformation graph, in accordance with an embodiment of the disclosure. FIG. 4 is explained in conjunction with elements from FIGS. 1, 2, and 3. With reference to FIG. 4, there is shown a diagram 400 that depicts generation of a double-layered deformation graph 402 of the human object 116. The circuitry 202 may construct the double-layered deformation graph 402 for the selected key-frame as a double-layer representation of the human object 116. The double-layered deformation graph 402 may be represented as a combination of inner-body skeletal nodes 404A . . . 404N of a 3D human model 406 (e.g., obtained at 302C) and an on-body node graph 408.

The circuitry 202 may sample a set of nodes 410 on the body of the 3D human model 406 to generate the on-body node graph 408. Each node of the set of nodes 410 may correspond to a 3D point on the 3D human mesh of the human object 116. The set of nodes 410 may include on-body nodes 412 and far-body nodes 414. Therefore, the on-body node graph 408 may represent a double node graph. While the on-body nodes 412 may be affected non-rigid motion as wells by the articulate motion of the inner-body skeletal nodes 404A . . . 404N, the far-body nodes 414 may be affected by the non-rigid motion. The far-body nodes 414 may have a least degree of freedom and the on-body nodes 412 may have the highest degree of freedom. In at least one embodiment, the circuitry 202 may compare distance between each node of the set of nodes 410 and a corresponding human joint of the skeleton. Based on the comparison. the circuitry 202 may classify the set of nodes 410 into the on-body nodes 412 and the far-body nodes 414.

The double-layered deformation graph 402 may include an outer layer and an inner layer. The outer layer may correspond to the non-rigid motion of the human object 116 and may be associated with, for example, cloth of the human object 116, facial features of the human object 116, expressions of the human object 116, hair of the human object 116, and the like. The inner layer may correspond to the articulate motion of the human object 116 and may be associated with a parametric human shape and a skeleton model with the human joints.

The circuitry 202 may be configured to parameterize the inner layer and the outer layer in order to track the articulate motion and the non-rigid motion of the human object 116. For example, in order to construct the double-layered deformation graph 402, the circuitry 202 may sample the inner-body skeletal nodes 404A . . . 404N from the 3D human model 406 and may further sample the on-body nodes 412 to obtain the on-body node graph 408. The inner-body skeletal nodes 404A . . . 404N may be associated with Linear Blend Skinning (LBS) parameters for articular motion of the human object 116. The motion of the inner-body skeletal nodes 404A . . . 404N may cause at least portion of the on-body nodes 412 to move. Additionally, far-body nodes 414 on outer surface regions (e.g., clothes) that appear close to the inner body region may be included with the on-body node graph 408.

In order to obtain a tracking sequence for the 3D human mesh of the human object 116, an optimization problem may be solved to minimize the energy of an objective function, jointly, for the non-rigid deformations and articulate motion of the human object 116. In the optimization problem, the non-rigid deformation of the on-body nodes 412 may be constrained to follow skeletal motions of the inner-body skeletal nodes 404A . . . 404N. The far-body nodes 414 may also be considered but may not be constrained by the skeletal motions. By way of example, the circuitry 202 may minimize the energy of the objective function, given in equation (2), as follows:

$$E = \lambda_{data}E_{data} + \lambda_{reg}E_{reg} + \lambda_{corr}E_{corr} + \lambda_{bind}E_{bind} \quad (2)$$

$E_{data}$, $E_{reg}$, $E_{corr}$, and $E_{bind}$ may be energies of each of data term, regularization term, correspondence term, and binding term, respectively. $E_{data}$ may be associated with a relationship between position and normal of each of the vertices of the 3D human mesh. $E_{reg}$ may smooth the nonrigid motion of neighbor nodes and prevent large articulate joint angle change from the reference human pose. $E_{corr}$ may indicate that anchor point correspondence on the mesh surface, (not necessary to be a vertex, for example, detected face landmarks, un-projected features detected by optical flow), among the number of frames and the selected key frame may remain constant. $E_{bind}$ may constrain the nonrigid motion of the on-body nodes 412 to be the same articulate motion driven by the skeleton.

In at least one embodiment, the circuitry 202 may establish a correspondence (e.g., a per-vertex correspondence) for albedo parameters and the lighting parameters of the 3D human mesh from the selected key frame and up to the number of frames of the input human-dynamics sequence. For example, in order to establish the correspondence, the objective function of equation (2) may be updated to equation (3), as follows:

$$E = \lambda_{data}E_{data} + \lambda_{reg}E_{reg} + \lambda_{corr}E_{corr} + \\ \lambda_{bind}E_{bind} + \lambda_{shading}E_{shading} + \lambda_{lreg}E_{lreg} \quad (3)$$

$E_{shading}$ and $E_{lreg}$ may be energies of shading term and lighting regularization term respectively. $E_{shading}$ may indicate that the shade of each deformed vertex under the estimated lighting of this frame may be consistent with corresponding color intensity of the target position found in $E_{data}$. $E_{lreg}$ may indicate that the estimated lighting of each frame remains constant along the input human-dynamics sequence. To be specific, the objective function indicates, for each frame of the input human-dynamics sequence, the shading for all vertices and the lighting of the scene may be consistent. For example, if a vertex position changes then the shade of the vertex position may also change in accordance with the position of the vertex.

From the selected key-frame and up to a number of frames of the input human-dynamics sequence, the circuitry 202 may generate the tracking sequence by solving for the objective function of equation (3). In case the input human-dynamics sequence comprises only geometry sequence and not RGB images, equation (2) may be optimized instead of equation (3).

The nonlinear optimization of equation (2) or equation (3) may be solved efficiently, for example, by the Gauss-Newton method within 10 iterations with respect to parameters, such as 6 degree of freedom (DOF) per node for nonrigid motion, 3 DOF per joint for articulate motion, and 3 DOF for one global translation. Some joints may be grouped together to avoid overfitting and unnatural angles, for example, DOF of finger joints may be reduced via PCA-based dimensionality reduction to produce a more natural hand gesture.

In at least one embodiment, the circuitry 202 may determine, from the input human-dynamics sequence, a set of frames for which the geometry information of the human object 116 is non-overlapping with that of other human objects in the set of frames. For each of the 3D human mesh of the human object and 3D human meshes of the other human objects, the circuitry 202 may establish a per-vertex correspondence by minimizing an energy of the objective function for each of the 3D human mesh of the human object 116 and the 3D human meshes of the other human objects. In such instances, the objective function may include a lighting regularization term and a shading term, as provided, for example, in equation (3). The objective function may need to be separately solved and optimized (minimized) for each of the human object 116 and the other human objects. The circuitry 202 may generate the tracking sequence for the 3D human mesh of the human object 116 and the 3D human meshes of the other human objects further based on the established per-vertex correspondence.

Figure 5:
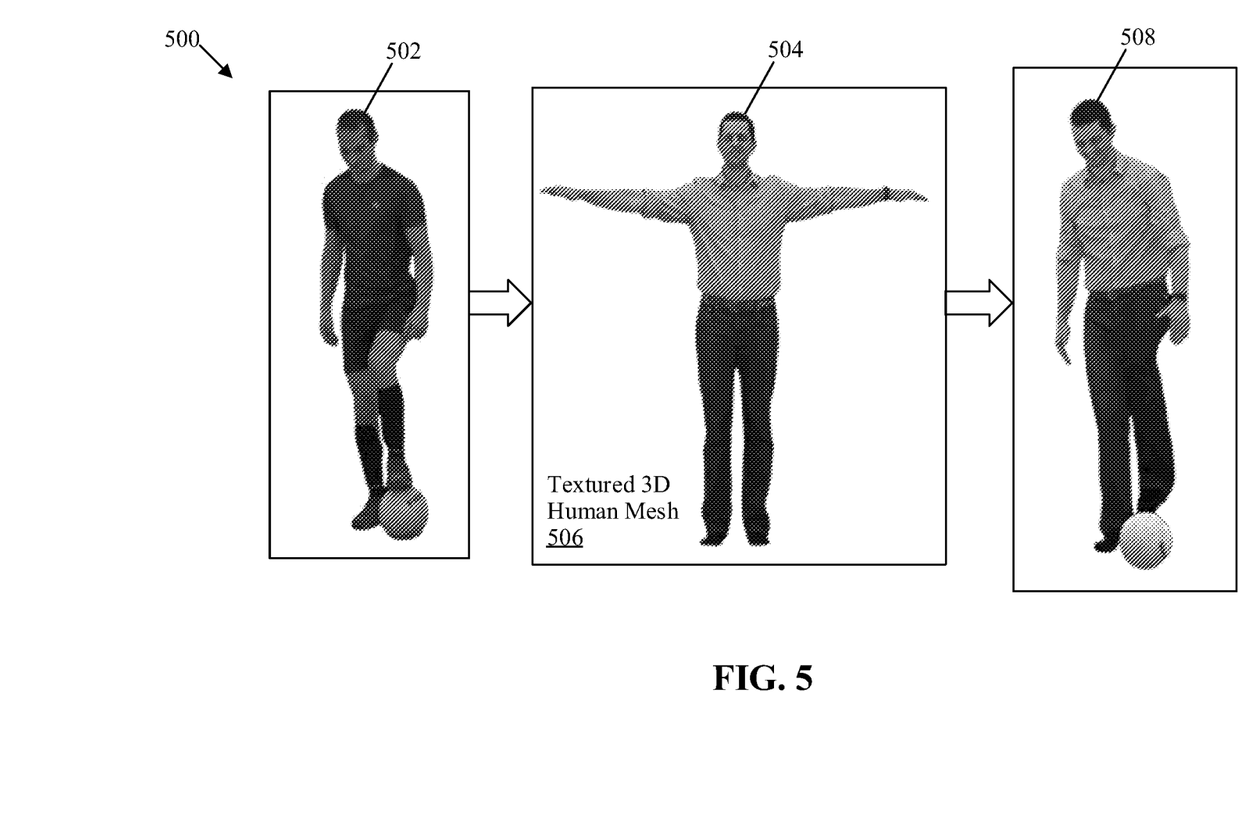
FIG. 5 is a diagram that illustrates an exemplary scenario for 4-Dimensional (4D) video reenactment by the system of FIG. 2, in accordance with an embodiment of the disclosure.

FIG. 5 is a diagram that illustrates an exemplary scenario for 4-Dimensional (4D) video reenactment by the system of FIG. 2, in accordance with an embodiment of the disclosure. FIG. 5 is explained in conjunction with elements from FIGS. 1, 2, 3A, 3B, and 4. With reference to FIG. 5, there is shown a diagram 500 that illustrates an exemplary scenario for 4D video reenactment. In the diagram 500, there is shown a first human object 502 and a second human object 504. The first human object 502 may be an original performer (e.g., a freestyle soccer player, as shown) of an act/performance which may be scanned via the scanning setup 108 in the 3D environment 114. Based on operations described in FIGS. 3A, 3B, and 4, the circuitry 202 may generate a tracking sequence for a first 3D human mesh for the first human object 502.

For the second human object 504 to reenact the act/performance of the first human object 502, the second human object 504 may be scanned via the scanning setup 108 and a textured 3D human mesh 506 of the second human object 504 may be generated in a reference pose, such as a T-pose (as shown). The circuitry 202 may apply the generated tracking sequence for the first 3D human mesh on the textured 3D human mesh 506 of the second human object 504. Once applied, an FVV (e.g., an FVV frame 508) may be rendered to re-enact the performance of the first human object 502 by the second human object 504.

Figure 6:
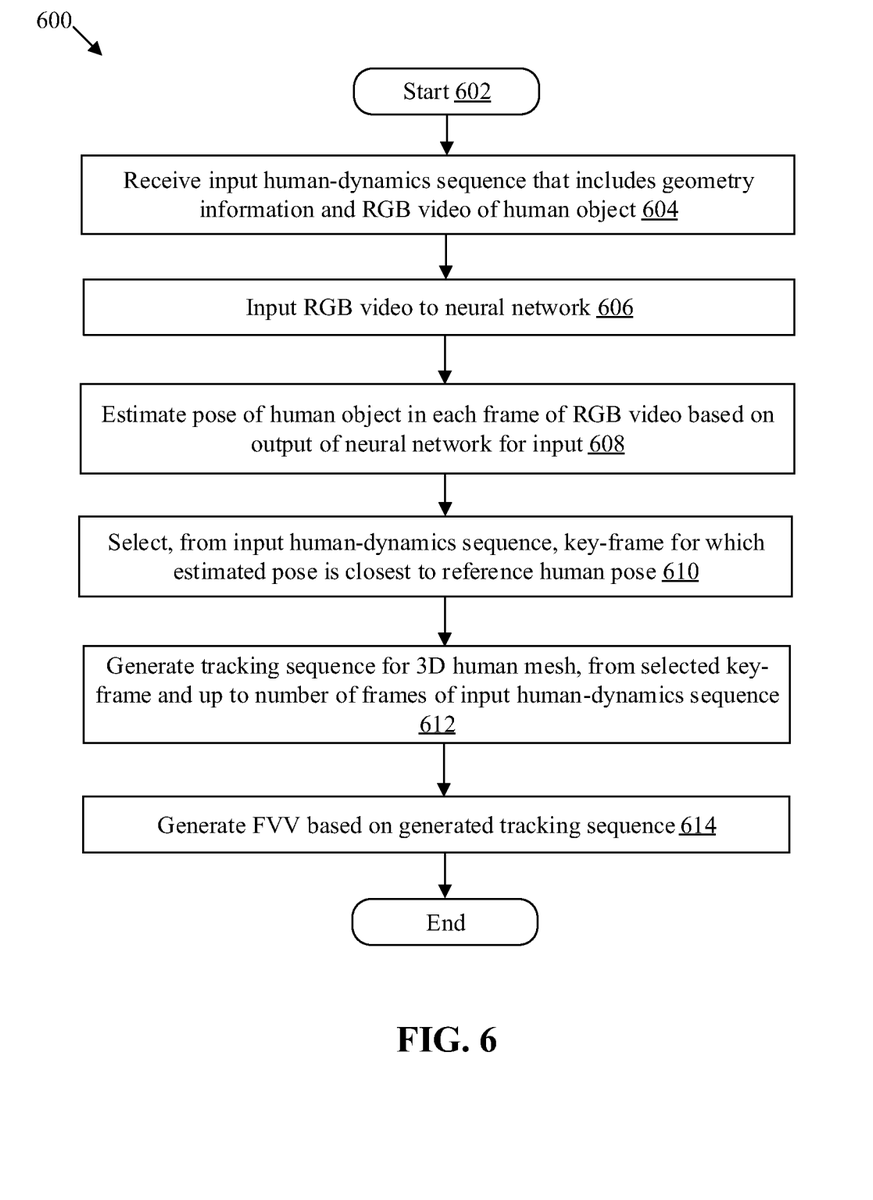
FIG. 6 is a flowchart that illustrates exemplary operations of detection-guided tracking of human-dynamics, in accordance with an embodiment of the disclosure.

FIG. 6 is a flowchart that illustrates exemplary operations of detection-guided tracking of human-dynamics, in accordance with an embodiment of the disclosure. With reference to FIG. 6, there is shown a flowchart 600. The flowchart 600 is described in conjunction with FIGS. 1, 2, 3A, 3B, 4, and 5. The operations 602 to 612 may be implemented by any computing system, such as by the system 102 of FIG. 2. The operations in the flowchart 600 starts at 602 and proceed to 604.

At 604, an input human-dynamics sequence that includes geometry information and an RGB video of the human object 116 may be received. In at least one embodiment, the circuitry 202 may receive the input human-dynamics sequence that includes geometry information and the RGB video of the human object 116.

At 606, the RGB video may be input to the neural network 104. In at least one embodiment, the circuitry 202 may input the RGB video to the neural network 104.

At 608, a pose of the human object 116 may be estimated in each frame of the RGB video based on an output of the neural network 104 for the input. In at least one embodiment, the circuitry 202 may estimate the pose of the human object 116 in each frame of the RGB video based on the output of the neural network 104 for the input (e.g., the sequence of frames 306A . . . 306N of the RGB video). The estimated pose may include features associated with the human joints 308A . . . 308N and face landmarks 310A . . . 310N of the human object 116.

At 610, from the input human-dynamics sequence, a key-frame may be selected for which the estimated pose is closest to a reference human pose. In at least one embodiment, the circuitry 202 may select, from the input human-dynamics sequence, a key-frame for which the estimated pose is closest to a reference human pose (for example, a T-pose).

At 612, from the selected key-frame and up to a number of frames of the input human-dynamics sequence, a tracking sequence may be generated for a 3D human mesh of the human object 116. In at least one embodiment, the circuitry 202 may generate a tracking sequence, from the selected key-frame and up to a number of frames of the input human-dynamics sequence. The generated tracking sequence may include final values of parameters of articulate motion and non-rigid motion of a set of 3D human points on the 3D human mesh.

At 614, an FVV may be generated based on the generated tracking sequence. In at least one embodiment, the circuitry 202 may generate the FVV based on the generated tracking sequence. Control may pass to end.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits. The set of instructions may be executable by the machine and/or the computer to perform operations that include receiving an input human-dynamics sequence. The input human-dynamics sequence includes geometry information of a human object and an RGB video of the human object. The operations further include inputting the RGB video to a neural network and estimating a pose of the human object in each frame of the RGB video based on an output of the neural network for the input. The estimated pose includes features associated with human joints and face landmarks of the human object. The operations further include selecting, from the input human-dynamics sequence, a key-frame for which the estimated pose is closest to a reference human pose. The operations further include generate a tracking sequence for a 3D human mesh, from the selected key-frame and up to a number of frames of the input human-dynamics sequence. The generated tracking sequence includes final values of parameters of articulate motion and non-rigid motion of a set of 3D points on the 3D human mesh. The operations further include generating a free-viewpoint video (FVV) based on the generated tracking sequence for the 3D human mesh.

Certain embodiments of the disclosure may be found in a system and method for detection-guided tracking of human-dynamics. Various embodiments of the disclosure may provide the system (such as the system 102 (FIG. 1)), may include circuitry (such as the circuitry 202 (FIG. 2)). The circuitry may receive input human-dynamics sequence that includes geometry information (such as the geometry information 304A . . . 304N (FIGS. 3A and 3B)) of a human object (such as the human object 116 (FIG. 1)) and an RGB video of the human object. The circuitry may be further configured to input the RGB video to the neural network (such as the neural network 104 (FIG. 1)) and estimate a pose (one of the estimated poses) of the human object in each frame of the RGB video based on an output of the neural network for the input. The estimated pose may include features associated with human joints (such as the human joints 308A . . . 308N) and face landmarks (such as the face landmarks 310A . . . 310N) of the human object. The circuitry may be further configured to select, from the input human-dynamics sequence, a key-frame for which the estimated pose may be closest to a reference human pose. The circuitry may be further configured to generate a tracking sequence for a 3D human mesh, from the selected key-frame and up to a number of frames of the input human-dynamics sequence. The generated tracking sequence may include final values of parameters of articulate motion and non-rigid motion of a set of 3D points on the 3D human mesh. The circuitry may be further configured to generate a free-viewpoint video (FVV) based on the generated tracking sequence for the 3D human mesh.

In accordance with an embodiment, the system may further include a memory (such as the memory 204 (FIG. 2)). The memory 204 may be configured to store the neural network pre-trained to detect the human joints and the face landmarks. In accordance with an embodiment, the neural network may be a multi-stage Convolutional Neural Network (CNN).

In accordance with an embodiment, the system may further include a scanning setup (such as the scanning setup 108 (FIG. 1)). The scanning setup may be configured to capture the RGB video that includes a sequence of frames of the human object from a set of viewpoints in a 3D environment (such as the 3D environment 114). The scanning setup may be further configured to acquire the geometry information of the human object from the set of viewpoints. The geometry information 304A . . . 304N may include a sequence of point cloud frames of the human object. In accordance with an embodiment, the received geometry information may include a sequence of 3D meshes. Each 3D mesh of the sequence of 3D meshes may include 3D coordinate information, texture information, shading information, and lighting information associated with the human object.

In accordance with an embodiment, the circuitry may be further configured to compare the estimated pose of the human object in each frame of the input human-dynamics sequence with a reference human pose based on a threshold distance-measure. The reference human pose may be, for example, a T-pose. The circuitry may be further configured to estimate a key-frame score for each frame of the input human-dynamics sequence based on the comparison. The circuitry may be further configured to select, from the input human-dynamics sequence, the key-frame for which the estimated key-frame score may be a maximum.

In accordance with an embodiment, the circuitry may be further configured to construct a 3D human model (one of the 3D human models 312A . . . 312N (FIGS. 3A and 3B)) for each frame of the input human-dynamics sequence by fitting a template human model on the estimated pose and the received geometry information.

In accordance with an embodiment, the circuitry may be further configured to establish a correspondence for albedo parameters and lighting parameters of the 3D human mesh from the selected key-frame and up to the number of frames of the input human-dynamics sequence. The correspondence may be established based on an objective function that includes a lighting regularization term and an albedo term. The circuitry may be further configured to generate the tracking sequence for the 3D human mesh further based on the established correspondence.

In accordance with an embodiment, the circuitry may be further configured to generate a double-layered deformation graph (such as the double-layered deformation graph 402 (FIG. 4)) for the selected key-frame based on the constructed 3D human model. The double-layered deformation graph may include Linear Blend skinning (LBS) parameters for the articulate motion and an on-body node graph (such as the on-body node graph 408) for the non-rigid motion. In accordance with an embodiment, the double-layered deformation graph may further include rigid deformation parameters for a rigid motion of the set of 3D points.

In accordance with an embodiment, the circuitry may be further configured to select, from the input human-dynamics sequence, the number of frames that may precede or succeed the selected key-frame. The circuitry may be further configured to form pairs of consecutive frames based on the selected key-frame and the selected number of frames. The circuitry may be further configured to estimate the final values of parameters of the articulate motion and the non-rigid motion between each pair of the formed pairs of consecutive frames, based on the generated double-layered deformation graph for the selected key-frame and an objective function for the generated double-layered deformation graph. The circuitry may be further configured to generate the tracking sequence including the estimated final values of the parameters. In accordance with an embodiment, the generated tracking sequence may be associated with body motion, cloth motion, muscle deformation, and expressions associated with the human object.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A system, comprising:
   circuitry configured to:
      receive an input human-dynamics sequence comprising geometry information of a human object and an RGB video of the human object;
      input the RGB video to a neural network;
      estimate a pose of the human object in each frame of the RGB video based on an output of the neural network for the input, wherein the estimated pose comprises features associated with human joints and face landmarks of the human object;
      select, from the input human-dynamics sequence, a key-frame for which the estimated pose is closest to a reference human pose;

generate a tracking sequence for a 3D human mesh, from the selected key-frame and up to a number of frames of the input human-dynamics sequence, wherein the generated tracking sequence comprises final values of parameters of articulate motion and non-rigid motion of a set of 3D points on the 3D human mesh; and generate a free-viewpoint video (FVV) based on the generated tracking sequence for the 3D human mesh.

2. The system according to claim 1, further comprising a memory configured to store the neural network that is pre-trained to detect the human joints and the face landmarks.

3. The system according to claim 1, wherein the neural network is a multi-stage Convolutional Neural Network (CNN).

4. The system according to claim 1, further comprising a scanning setup configured to:
capture the RGB video comprising a sequence of frames of the human object from a set of viewpoints in a 3D environment; and
acquire the geometry information of the human object from the set of viewpoints, wherein the geometry information comprises a sequence of point cloud frames of the human object.

5. The system according to claim 1, wherein
the received geometry information includes a sequence of 3D meshes, and each 3D mesh of the sequence of 3D meshes includes 3D coordinate information, texture information, shading information, and lighting information associated with the human object.

6. The system according to claim 1, wherein the circuitry is further configured to:
compare the estimated pose of the human object in each frame of the input human-dynamics sequence with a reference human pose based on a threshold distance-measure;
estimate a key-frame score for each frame of the input human-dynamics sequence based on the comparison; and
select, from the input human-dynamics sequence, the key-frame for which the estimated key-frame score is a maximum.

7. The system according to claim 6, wherein the reference human pose is a T-pose.

8. The system according to claim 1, wherein the circuitry is further configured to:
establish a correspondence for albedo parameters and lighting parameters of the 3D human mesh, from the selected key-frame and up to the number of frames, wherein the correspondence is established based on an objective function that comprises a lighting regularization term and an albedo term; and
generate the tracking sequence for the 3D human mesh further based on the established correspondence.

9. The system according to claim 1, wherein the circuitry is further configured to:
determine, from the input human-dynamics sequence, a set of frames for which the geometry information of the human object is non-overlapping with that of other human objects in the set of frames;
establish a per-vertex correspondence for each of the 3D human mesh of the human object and 3D human meshes of the other human objects by minimizing an energy of an objective function for each of the 3D human mesh of the human object and the 3D human meshes of the other human objects, wherein the objective function comprises a lighting regularization term and a shading term; and
generate the tracking sequence for the 3D human mesh of the human object and the 3D human meshes of the other human objects further based on the established per-vertex correspondence.

10. The system according to claim 1, wherein the circuitry is further configured to construct a 3D human model for each frame of the input human-dynamics sequence by fitting a template human model on the estimated pose and the received geometry information.

11. The system according to claim 10, wherein the circuitry is further configured to generate a double-layered deformation graph for the selected key-frame based on the constructed 3D human model,
wherein the double-layered deformation graph comprises Linear Blend skinning (LBS) parameters for the articulate motion and an on-body node graph for the non-rigid motion.

12. The system according to claim 11, wherein the double-layered deformation graph further comprises rigid deformation parameters for a rigid motion of the set of 3D points.

13. The system according to claim 11, wherein the circuitry is further configured to:
select, from the input human-dynamics sequence, the number of frames that precedes or succeeds the selected key-frame;
form pairs of consecutive frames based on the selected key-frame and the selected number of frames;
estimate the final values of the parameters of the articulate motion and the non-rigid motion between each pair of the formed pairs of consecutive frames, based on the generated double-layered deformation graph for the selected key-frame and an objective function for the generated double-layered deformation graph; and
generate the tracking sequence comprising the final values of the parameters.

14. The system according to claim 1, wherein the generated tracking sequence is associated with body motion, cloth motion, muscle deformation, and expressions associated with the human object.

15. A method, comprising:
receiving an input human-dynamics sequence comprising geometry information of a human object and an RGB video of the human object;
inputting the RGB video to a neural network;
estimating a pose of the human object in each frame of the RGB video based on an output of the neural network for the input, wherein the estimated pose comprises features associated with human joints and face landmarks of the human object;
selecting, from the input human-dynamics sequence, a key-frame for which the estimated pose is closest to a reference human pose;
generating a tracking sequence for a 3D human mesh, from the selected key-frame and up to a number of frames of the input human-dynamics sequence, wherein the generated tracking sequence comprises final values of parameters of articulate motion and non-rigid motion of a set of 3D points on the 3D human mesh; and
generating a free-viewpoint video (FVV) based on the generated tracking sequence for the 3D human mesh.

16. The method according to claim 15, further comprising:
 establishing a correspondence for albedo parameters and lighting parameters of the 3D human mesh, from the selected key-frame and up to the number of frames, wherein the correspondence is established based on an objective function that comprises a lighting regularization term and an albedo term; and
 generating the tracking sequence for the 3D human mesh further based on the established correspondence.

17. The method according to claim 15, wherein the neural network is a multi-stage Convolutional Neural Network (CNN).

18. The method according to claim 15, further comprising constructing a 3D human model for each frame of the input human-dynamics sequence by fitting a template human model on the estimated pose and the received geometry information.

19. The method according to claim 18, further comprising generating a double-layered deformation graph for the selected key-frame based on the constructed 3D human model,
 wherein the double-layered deformation graph comprises Linear Blend skinning (LBS) parameters for the articulate motion and an on-body node graph for the non-rigid motion.

20. The method according to claim 19, further comprising:
 selecting, from the input human-dynamics sequence, the number of frames that precedes or succeeds the selected key-frame;
 forming pairs of consecutive frames based on the selected key-frame and the selected number of frames;
 estimating the final values of the parameters of the articulate motion and the non-rigid motion between each pair of the formed pairs of consecutive frames, based on the generated double-layered deformation graph for the selected key-frame and an objective function for the generated double-layered deformation graph; and
 generating the tracking sequence comprising the final values of the parameters.

21. A non-transitory computer-readable medium having stored thereon computer-readable instructions, which when executed by a system, cause the system to execute operations, the operations comprising:
 receiving an input human-dynamics sequence comprising geometry information of a human object and an RGB video of the human object;
 inputting the RGB video to a neural network;
 estimating a pose of the human object in each frame of the RGB video based on an output of the neural network for the input, wherein the estimated pose comprises features associated with human joints and face landmarks of the human object;
 selecting, from the input human-dynamics sequence, a key-frame for which the estimated pose is closest to a reference human pose;
 generating a tracking sequence for a 3D human mesh, from the selected key-frame and up to a number of frames of the input human-dynamics sequence, wherein the generated tracking sequence comprises final values of parameters of articulate motion and non-rigid motion of a set of 3D points on the 3D human mesh; and
 generating a free-viewpoint video (FVV) based on the generated tracking sequence for the 3D human mesh.

* * * * *